US009406114B2

(12) United States Patent
Li et al.

(10) Patent No.: US 9,406,114 B2
(45) Date of Patent: Aug. 2, 2016

(54) COMPOSITE IMAGE GENERATION TO REMOVE OBSCURING OBJECTS

(71) Applicant: EMPIRE TECHNOLOGY DEVELOPMENT LLC, Wilmington, DE (US)

(72) Inventors: Daqi Li, Xi'An (CN); Jun Fang, Xi'An (CN)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 14/428,244

(22) PCT Filed: Feb. 18, 2014

(86) PCT No.: PCT/CN2014/000159
§ 371 (c)(1),
(2) Date: Mar. 13, 2015

(87) PCT Pub. No.: WO2015/123791
PCT Pub. Date: Aug. 27, 2015

(65) Prior Publication Data
US 2016/0012574 A1 Jan. 14, 2016

(51) Int. Cl.
*G06T 15/00* (2011.01)
*G06T 5/20* (2006.01)
(Continued)

(52) U.S. Cl.
CPC ............ *G06T 5/20* (2013.01); *G06F 17/30244* (2013.01); *G06K 9/00208* (2013.01);
(Continued)

(58) Field of Classification Search
None
See application file for complete search history.

(56) References Cited

U.S. PATENT DOCUMENTS

| 6,201,642 B1 | 3/2001 | Bos |
| 8,090,153 B2 | 1/2012 | Schofield et al. |

(Continued)

FOREIGN PATENT DOCUMENTS

| CN | 102013094 A | 4/2011 |
| CN | 102609894 A | 7/2012 |

(Continued)

OTHER PUBLICATIONS

Dorothy, "Japan developed a transparent car parking will help dyslexia crowd," Retrieved from URL: https://web.archive.org/web/20130207231636/http://auto.ifeng.com/xinwen/20121106/824867.shtml, on Dec. 30, 2014, posted on Nov. 6, 2012, pp. 1-4.

(Continued)

*Primary Examiner* — Xiao Wu
*Assistant Examiner* — Mohammad H Akhavannik
(74) *Attorney, Agent, or Firm* — Moritt Hock & Hamroff LLP; Steven S. Rubin, Esq.

(57) ABSTRACT

Technologies are generally described for methods and systems effective to generate a composite image. The methods may include receiving first image data that includes object data corresponding to an object and receiving second image data that includes obscuring data. The obscuring data, if displayed on a display, may obscure at least a portion of the. The methods may also include identifying a first region that may include the object data, in the first image data. The methods may also include identifying a second region, that may include the obscuring data, in the second image data. The methods may also include replacing at least part of the second region with at least part of the first region to generate the composite image data that may include at least some of the object data. The methods may also include displaying the composite image on a display.

17 Claims, 6 Drawing Sheets

(51) Int. Cl.

| | |
|---|---|
| *G06T 5/50* | (2006.01) |
| *G06F 17/30* | (2006.01) |
| *G06K 9/00* | (2006.01) |
| *G06T 3/40* | (2006.01) |
| *G06T 5/00* | (2006.01) |
| *G06T 11/60* | (2006.01) |
| *G06T 15/20* | (2011.01) |
| *H04N 5/232* | (2006.01) |
| *H04N 5/272* | (2006.01) |

(52) U.S. Cl.
CPC .............. *G06T3/403* (2013.01); *G06T 3/4007* (2013.01); *G06T 5/005* (2013.01); *G06T 5/50* (2013.01); *G06T 11/60* (2013.01); *G06T 15/205* (2013.01); *H04N 5/232* (2013.01); *H04N 5/272* (2013.01); *G06T 2200/04* (2013.01); *G06T 2207/20192* (2013.01); *G06T 2207/20221* (2013.01); *G06T 2207/30252* (2013.01); *G06T 2207/30261* (2013.01)

(56) References Cited

U.S. PATENT DOCUMENTS

| | | | | |
|---|---|---|---|---|
| 8,686,873 | B2* | 4/2014 | Demirdjian | G08G 1/164 340/425.5 |
| 9,024,973 | B2* | 5/2015 | Thorn | G06F 3/011 345/156 |
| 2003/0085907 | A1 | 5/2003 | Matsuoka et al. | |
| 2003/0108222 | A1 | 6/2003 | Sato et al. | |
| 2009/0140881 | A1* | 6/2009 | Sakai | G08G 1/164 340/901 |
| 2009/0231431 | A1* | 9/2009 | Grigsby | G08G 1/161 348/149 |
| 2010/0295937 | A1 | 11/2010 | Longobardi | |
| 2014/0285516 | A1* | 9/2014 | Shulman | G01C 21/3647 345/629 |

FOREIGN PATENT DOCUMENTS

| | | |
|---|---|---|
| EP | 2608148 A2 | 6/2013 |
| WO | 02073535 A2 | 9/2002 |

OTHER PUBLICATIONS

"Google Street View," Wikipedia, Retrieved from URL: https://web.archive.org/web/20140217053445/https://en.wikipedia.org/wiki/Google_Street_View, on Dec. 30, 2014, last modified on Feb. 8, 2014, pp. 1-12.

"Virtual Reality," Wikipedia, Retrieved from URL: https://web.archive.org/web/20140217022652/http://en.wikipedia.org/wiki/Virtual_reality, on Dec. 30, 2014, last modified on Feb. 15, 2014, pp. 1-13.

International Search Report and Written Opinion for International Application No. PCT/CN2014/000159 mailed on Nov. 21, 2014, 9 pages.

* cited by examiner

500 A computer program product.

502 A signal bearing medium.

504

At least one of

One or more instructions for generating a composite image; or

One or more instructions for receiving first image data that includes object data, wherein the object data corresponds to an object; or One or more instructions for receiving second image data that includes obscuring data, where the obscuring data, if displayed on a display, would obscure at least a portion of the object; or One or more instructions for identifying a first region in the first image data, wherein the first region includes the object data; or One or more instructions for identifying a second region in the second image data, wherein the second region includes the obscuring data; or One or more instructions for replacing at least part of the second region in the second image data with at least part of the first region, to generate the composite image data, where the composite image data includes at least some of the object data; or One or more instructions for displaying the composite image on a display.

| 506 A computer-readable medium | 508 A recordable medium | 510 A communications medium |

Fig. 5

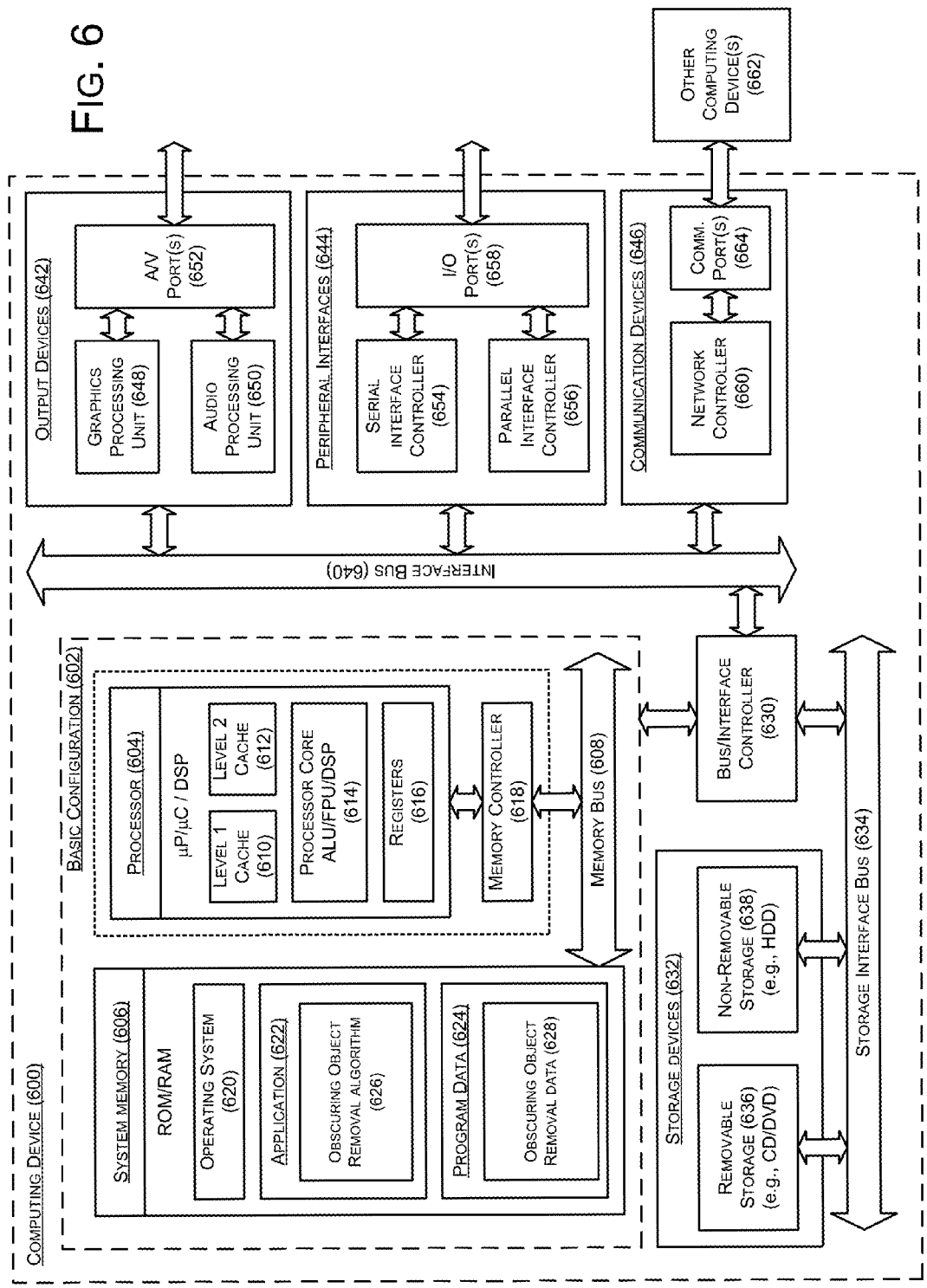

COMPOSITE IMAGE GENERATION TO REMOVE OBSCURING OBJECTS

CROSS REFERENCE TO RELATED APPLICATION

This application is the National Stage filing under 35 U.S.C. §371 of PCT Application Ser. No. PCT/CN2014/000159 filed on Feb. 18, 2014. The disclosure of the PCT Application is hereby incorporated herein by reference in its entirety.

BACKGROUND

Unless otherwise indicated herein, the materials described in this section are not prior art to the claims in this application and are not admitted to be prior art by inclusion in this section.

Vehicles may be used to transport drivers and passengers. An operator of the vehicle may view objects ahead and to the side of the vehicle during the operation of the vehicle. Passengers in the vehicle may also view objects ahead and to the side of the vehicle.

SUMMARY

In some examples, methods for generating a composite image are generally described. The methods may include receiving, by a device, first image data that includes object data. The object data may correspond to an object. The methods may also include receiving, by the device, second image data that includes obscuring data. The obscuring data, if displayed on a display, may obscure at least a portion of the object. The methods may also include identifying, by the device, a first region in the first image data. The first region may include the object data. The methods may also include identifying, by the device, a second region in the second image data. The second region may include the obscuring data. The methods may also include replacing, by the device, at least part of the second region in the second image data with at least part of the first region, to generate the composite image data. The composite image data may include at least some of the object data. The methods may also include displaying, by the device, the composite image on a display.

In some examples, devices configured to generate a composite image are generally described. A first device may include a camera, a display, and a processor. The processor may be configured to be in communication with the camera and the display. The processor may be configured to receive first image data from a second device. The first image data may include object data, and the object data may correspond to an object. The processor may also be configured to receive second image data from the camera. The second image data may include obscuring data. The obscuring data, if displayed on the display, may obscure at least a portion of the object. The processor may also be configured to identify a first region in the first image data. The first region may include the object data. The processor may also be configured to identify a second region in the second image data. The second region may include the obscuring data. The processor may also be configured to replace at least part of the second region in the second image data with at least part of the first region to generate the composite image data. The composite image data may include at least some of the object data. The processor may also be configured to display the composite image on the display.

In some examples, systems configured to generate a composite image are generally described. The systems may include a first device and a second device. The first device may include a first camera, a transmitter, and a first processor. The first processor may be configured to be in communication with the first camera and transmitter. The second device may include a display, a second camera, a receiver, and a second processor. The second processor may be configured to be in communication with the second camera, the receiver and the display. The first camera may be configured to generate first image data. The first image data may include object data, that may correspond to an object. The first processor may be configured to transmit the first image data through the transmitter from the first device to the second device. The receiver may be configured to receive the first image data. The second camera may be configured to generate second image data. The second image data may include obscuring data. The obscuring data, if displayed on the display, would obscure at least a portion of the object. The second processor may be configured to receive the first image data. The second processor may also be configured to receive the second image data. The second processor may also be configured to identify a first region in the first image data. The first region may include the object data. The second processor may also be configured to identify a second region in the second image data. The second region may include the obscuring data. The second processor may also be configured to replace at least part of the second region in the second image data with at least part of the first region to generate the composite image data. The composite image data may include at least part of the object data. The second processor may also be configured to display the composite image on the display.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 5 illustrates an example computer program product that can be utilized to implement composite image generation to remove obscuring objects; and FIG. 6 is a block diagram illustrating an example computing device that is arranged to implement composite image generation to remove obscuring objects, all arranged according to at least some embodiments described herein.

DETAILED DESCRIPTION

Figure 1:
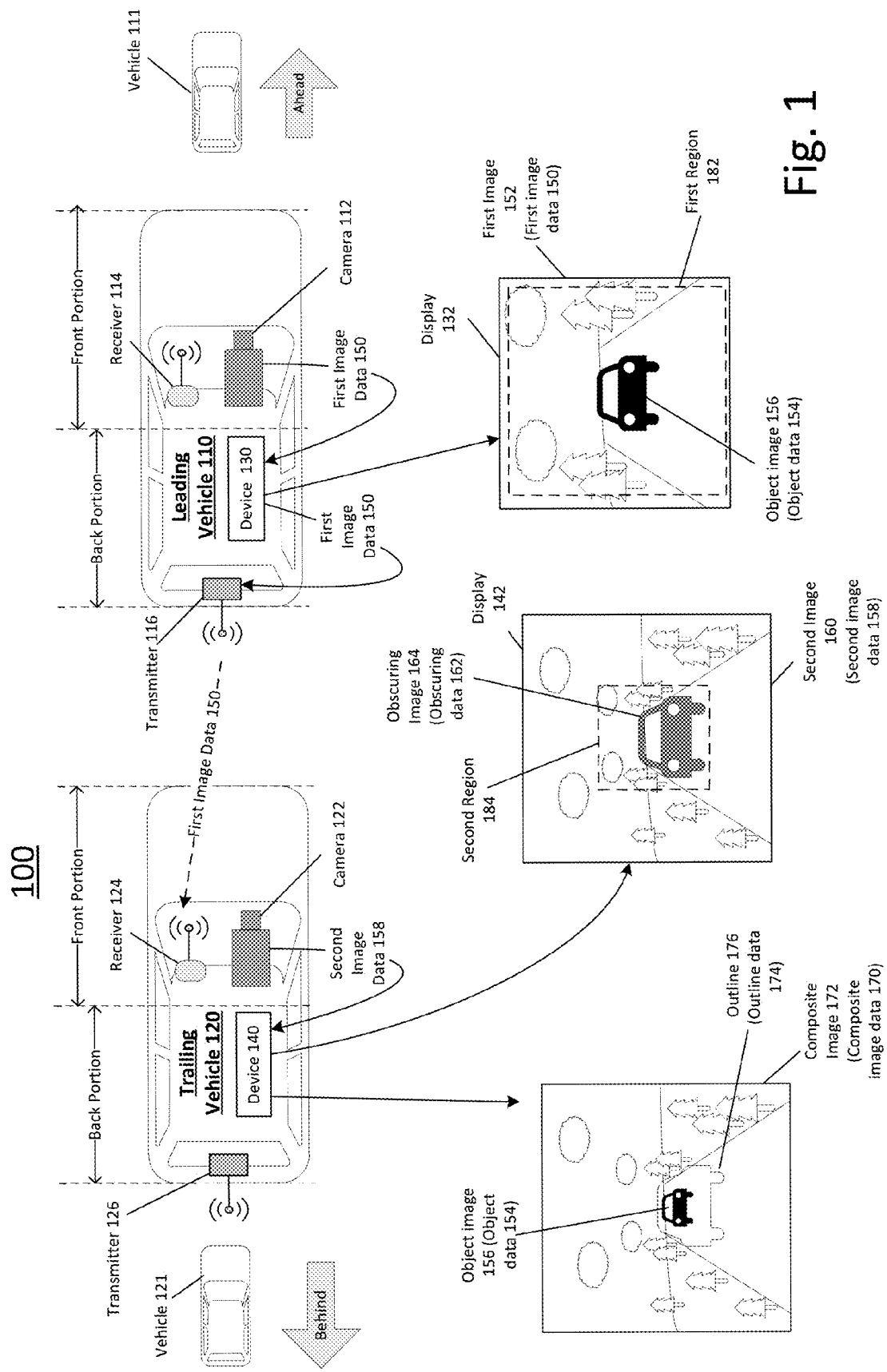
FIG. 1 illustrates an example system that can be utilized to implement composite image generation to remove obscuring objects.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to composite image generation to remove obscuring objects.

Briefly stated, technologies are generally described for methods and systems effective to generate a composite image. In some examples, the methods may include receiving first image data that includes object data corresponding to an object, such as a first vehicle, and receiving second image data that includes obscuring data, such as a second vehicle appearing in front of the first vehicle. The obscuring data, if displayed on a display, may obscure at least a portion of the object—e.g. the second vehicle may obscure a portion of the first vehicle. The methods may also include identifying a first region that may include the object data, in the first image data. For example, a processor may identify a portion of the first image data that includes the first vehicle. That portion may be labelled a first region. The methods may also include identifying a second region, which may include the obscuring data, in the second image data. The methods may also include replacing at least part of the second region with at least part of the first region to generate the composite image data that may include at least some of the object data. The methods may also include displaying the composite image on a display so that the second vehicle is removed and the first vehicle is displayed.

FIG. 1 illustrates an example system 100 that can be utilized to implement composite image generation to remove obscuring objects, arranged in accordance with at least some embodiments described herein. System 100 may include a leading vehicle 110 and a trailing vehicle 120. Leading vehicle 110 and trailing vehicle 120 may each include a front portion and a back portion. Front portion of leading vehicle 110 may include a camera 112 and/or a receiver 114. Back portion of leading vehicle 110 may include a transmitter 116. Leading vehicle 110 may further include a device 130. Device 130 may be disposed inside of leading vehicle 110 and may include a display 132. Device 130 may be configured to be in communication with camera 112, receiver 114, and/or transmitter 116. Similarly, front portion of trailing vehicle 120 may include a camera 122 and/or a receiver 124. Back portion of trailing vehicle 120 may include a transmitter 126. Trailing vehicle 120 may further include a device 140. Device 140 may be disposed inside of trailing vehicle 120 and may include a display 142. Device 140 may be configured to be in communication with camera 122, receiver 124, and/or transmitter 126. Device 130 and device 140 may include the same components.

In some examples, system 100 may further include an additional vehicle 111 positioned or located ahead (depicted by the arrow "Ahead") of leading vehicle 110 and/or an additional vehicle 121 positioned or located behind (as depicted by the arrow "Behind") trailing vehicle 120. Receiver 114 of leading vehicle 110 may be configured to receive data sent from a transmitter in a back portion of vehicle 111. Transmitter 126 of trailing vehicle 120 may be configured to send data sent to a receiver in a front portion of vehicle 121. In some examples, additional vehicles may be behind leading vehicle 110 and ahead of trailing vehicle 120.

Leading vehicle 110 and trailing vehicle 120 may be positioned or located in respective positions based on a respective communication direction of a respective transmitter and receiver. In the example depicted, transmitter 116 may be a directional transmitter that may be configured to send data towards a direction behind leading vehicle 110. Receiver 124 may be a directional receiver that may be configured to receive data from a direction ahead of trailing vehicle 120. Leading vehicle 110 and trailing vehicle 120 may be aligned in an arrangement such that transmitter 116 may communicate with receiver 124. Leading vehicle 110 may be ahead of trailing vehicle 120. Leading vehicle 110 may be a first vehicle in the arrangement and trailing vehicle 120 may be a last vehicle in the arrangement. Transmitter 116 may be configured to send data to receiver 124 through a network such as a Bluetooth wireless network or an infrared network. In some examples, transmitters 116, 126 may be directional antennas.

In an example, camera 112 of leading vehicle 110 may be configured to capture light reflected from objects ahead of leading vehicle 110 and may be configured to generate first image data 150 that corresponds to one or more objects ahead of leading vehicle 110. First image data 150, when displayed on display 132, may generate a first image 152, which may be an image of the one or more objects ahead of leading vehicle 110. First image data 150 may include object data that corresponds to one or more objects ahead of leading vehicle 110 such as a tree or a car or both. For example, first image data 150 may include object data 154 that corresponds to a vehicle (e.g. vehicle 111) ahead of leading vehicle 110. Object data 154, when displayed on display 132, may display an object image 156 that may be visible in first image 152. In the example, object image 156 may correspond to an image of vehicle 111. Camera 112 may be further configured to send first image data 150 to device 130. Device 130 may be configured to send first image data 150 to transmitter 116. In some examples, device 130 may compress first image data 150 prior to sending first image data 150 to transmitter 116. Transmitter 116 may send first image data 150 to receiver 124 of trailing vehicle 120. Receiver 124 of trailing vehicle 120 may receive first image data 150. Receiver 124 may send first image data 150 to device 140 of trailing vehicle 120.

In the example, camera 122 of trailing vehicle 120 may be configured to capture light reflected from objects ahead of trailing vehicle 120 and may be configured to generate second image data 158 that corresponds to objects ahead of trailing vehicle 120. Second image data 158, when displayed by display 142, may generate a second image 160, which may be an image of objects ahead of trailing vehicle 120. Second image data may include obscuring data that corresponds to objects ahead of trailing vehicle. For example, second image data 158 may include obscuring data 162 that corresponds to a first vehicle (e.g. leading vehicle 110) that obscures a second vehicle (e.g. vehicle 111). Obscuring data 162, when displayed by display 142, may produce an obscuring image 164 that may be visible in second image 160 and may correspond to an object that obscures the view of another object displayed in first image 152. In the example, leading vehicle 110 obscures a view of vehicle 111 in second image 160. Camera 122 may be configured to send second image data 158 to device 140. Device 140 may be configured to receive first image data 150 from receiver 124 and may receive second image data 158 from camera 122.

As discussed in more detail below, in response to receiving first image data 150 and second image data 158, device 140 may identify a first region 182 that may include object data 154 in first image data 150. Device 140 may further identify a second region 184 that may include obscuring data 162 in second image data 158. In response to identification of first region 182 and second region 184, device 140 may replace at least part of second region 184 in second image data 158 with at least a part of first region 182. The replacement may result in generation of composite image data 170 that, when display on a display, may produce a composite image 172. Composite image data 170 may include object data 154 from first image data 150 and may include outline data 174 that corresponds to an outline of the obscuring image 164. Outline data 174, when displayed on display 142, may produce an outline 176. Outline 176 may be an outline of obscuring image 164 and will be explained in more detail below.

As discussed in more detail below, a user in trailing vehicle 120 may desire to view object image 156 on display 142 of trailing vehicle 120. Obscuring image 164 may be obscuring at least a part of object image 156 when second image 160 is displayed on display 142. The user may use device 140 in trailing vehicle 120 to produce composite image 172 in order to view object image 156 on a display of trailing vehicle 120.

Figure 2:
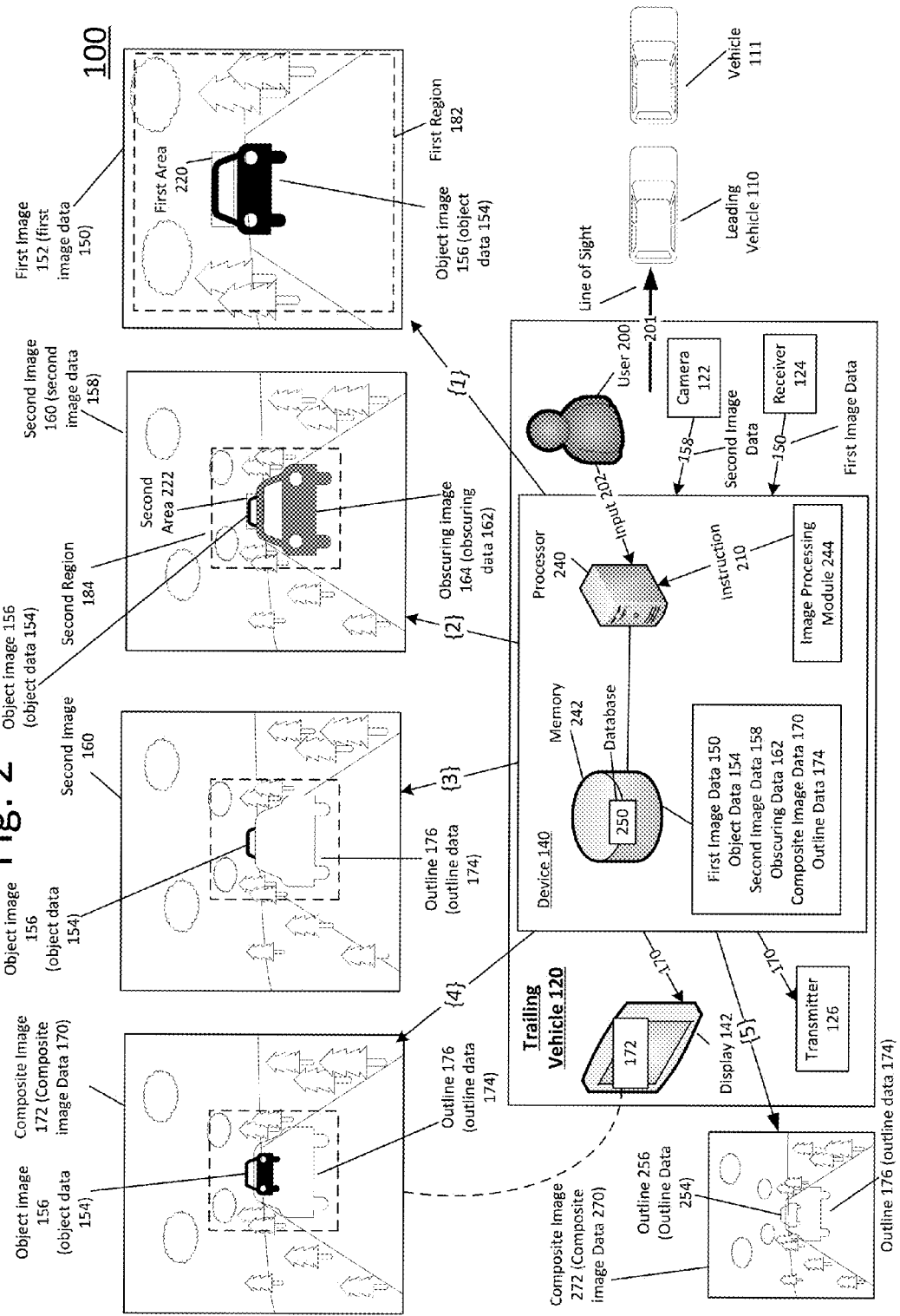
FIG. 2 illustrates the example system of FIG. 1 with additional detail relating to removal of obscuring data.

FIG. 2 illustrates system 100 of FIG. 1 with additional detail relating to removal of obscuring data, arranged in accordance with at least some embodiments described herein. FIG. 2 is substantially similar to system 100 of FIG. 1, with additional details. Those components in FIG. 2 that are labeled identically to components of FIG. 1 will not be described again for the purposes of clarity.

In an example, device 140 of trailing vehicle 120 may receive first image data 150 and second image data 158. A user 200 inside of trailing vehicle 120 may view objects ahead of trailing vehicle 120 through a line of sight 201. In an example where line of sight 201 is directed at leading vehicle 110, a field of view of user 200 may resemble second image 160, where obscuring image 164, such as leading vehicle 110, may obscure a part of object image 156, e.g. an image of leading vehicle 110 obscures an image of vehicle 111. User 200 may desire to view object image 156 and may provide an input 202, which corresponds to the production of composite image 172, to device 140. User 200 may provide input 202 to device 140 such as by voice command, or by using one or more buttons inside of trailing vehicle 120. Input 202 may be a request to produce composite image 172 in order for user 200 to view object image 156.

Device 140 may include a processor 240, a memory 242, and an image processing module 244. Processor 240 may be configured to be in communication with memory 242, image processing module 244 and display 142. Memory 242 may be configured to store a database 250. Database 250 may be a database that includes data relating to dimensions and/or appearances of one or more models of vehicles. In some examples, database 250 may further include image data of one or more vehicles. In some examples, image processing module 244 may be a part of device 140. In some examples, image processing module 244 may be a separate structure from device 140. Image processing module 244 may store an instruction 210 that may include instructions relating to generation of composite image data 170.

Processor 240 may be configured to facilitate transmission of data between device 140 and other components of trailing vehicle 120 such as to camera 122, receiver 124, transmitter 126, and/or display 228. Processor 240 may be further configured to retrieve instructions, such as instruction 210 that corresponds to the production of composite image 172, from image processing module 244. Processor 240 may be further configured to retrieve data from database 250 stored in memory 242. During implementation of system 100, processor 240 may be configured to store image data in memory 242. For example, processor 240 may store first image data 150, object data 154, second image data 158, obscuring data 162, composite image data 170, and/or outline data 174 in memory 242.

In the example, device 140 may receive input 202 from user 200 and, in response, may retrieve instruction 210 from image processing module 244. Processor 240 may execute instruction 210 to generate composite image data 170. The generation of composite image data 170 will now be described in more detail.

Processor 240 may identify first region 182 in first image data 150 (depicted as operation {1}). Processor 240 may identify first region 182 such as by comparing and identifying differences between first image data 150 and second image data 158 or by comparing first image data 150 with database 250. In some examples, processor 240 may identify first region 182 based on instructions in image processing module 244 that relates to edge detection or object outline identification. In some examples, user 200 may identify first region 182 visually and may provide indications of first region 182 to processor 240 such as by voice command or use of user interface on display 142. In some examples, first region 182 may include a portion of first image data 150. In some examples, first region 182 may be all of first image data 150. First region 182 may include object data 154.

After identification of first region 182, processor 240 may identify second region 184 in second image data 158 (depicted as operation {2}). Second region 184 may include a portion of second image data 182 and may also include obscuring data 162. In some examples, second region 184 may include a part of object data 154. Processor 240 may identify second region 184 such as by comparing and identifying differences between first image data 150 and second image data 158 or by comparing second image data 158 with database 250.

After identification of second region 184, processor 240 may identify outline 176 and outline data 174 of obscuring data 162 (depicted as operation {3}). Processor 240 may identify outline data 174 such as by comparing and identifying differences between first image data 150 and second image data 158 or by comparing second image data 158 with database 250. Identification of outline data 174 may include comparing obscuring data 162 to image data of the one or more vehicles stored in database 250. For example, database 250 may store ten pieces of image data relating to ten different vehicles. Processor 240 may compare obscuring data 162 with each of the pieces of image data stored in database 250. In response to a detection of a match between obscuring data 162 and one of the ten pieces of image data stored in database 250, processor 240 may generate outline data 174 that relates to an outline 176 of obscuring image 164.

After generation of outline data 174, processor 240 may replace at least a portion of second region 184 in second image data 158 with first region 182 in first image data 150. Prior to replacing second region 184 with first region 182, processor 240 may scale first region 182 based on a scaling factor. For example, processor 240 may determine the scaling factor based on a comparison one or more features in first region 182 and/or second region 184. An example of the one or more features that may be compared may be an area of first region 182 and an area of second region 184. Another example of the one or more features may be a part of object data 154 that appears in first region 182 and second region 184. In the example, the feature may be part of a vehicle. Another example of the one or more features may be common objects in first region 182 and second region 184 such as trees and/or clouds. Another example of the one or more features may be a particular part of first region 182 and a particular part of second region 184—in the example the particular part may be a top of a vehicle. The features may be compared by processor 240 to generate the scaling factor.

In an example of determining the scaling factor, the one or more features may be a part of object data 154 that appears in first region 182 and second region 184. Processor 240 may determine that the part of object data 154 in first region 182 may be associated with a first area 220 of first region 182. Processor 240 may determine that the part of object data 154 in second region 184 may be a second area 222 of second region 184. In the example, first area 220 may include a width of 80 pixels and a length of 20 pixels. Second area 222 may include a width of 40 pixels and a length of 10 pixels. Processor 240 may determine that the scaling factor is 0.5 based on the size of area 220 and the size of area 222. Processor 240 may then scale first region 182 using the scaling factor of 0.5 and then may replace second region 184 with the scaled first region 182. In some examples, after replacing second region 184 with scaled first region 182, processor 240 may add outline data 174 to the replaced second region 184 to generate composite image data 170 (depicted as operation {4}).

In response to generation of composite image data 170, device 140 may send composite image data 170 to transmitter 126. Device 140 may also command transmitter 126 to send composite image data 170 to a vehicle behind trailing vehicle 120.

In some examples, input 202 provided by user 200 may indicate a number of objects to be removed from second image data 158. For example, user 200 may desire to remove both object image 156 and obscuring image 164 from second image 160 to produce composite image data 270 and a composite image 272 (depicted as operation {5}). Processor 240 of device 140 may remove object data 154 and obscuring data 162 from second image data 158 and may add outline data 174 and outline data 254. Outline data 254, when displayed on display 142, may produce an outline 256. Outline 256 may be an outline of object image 156.

Figure 3:
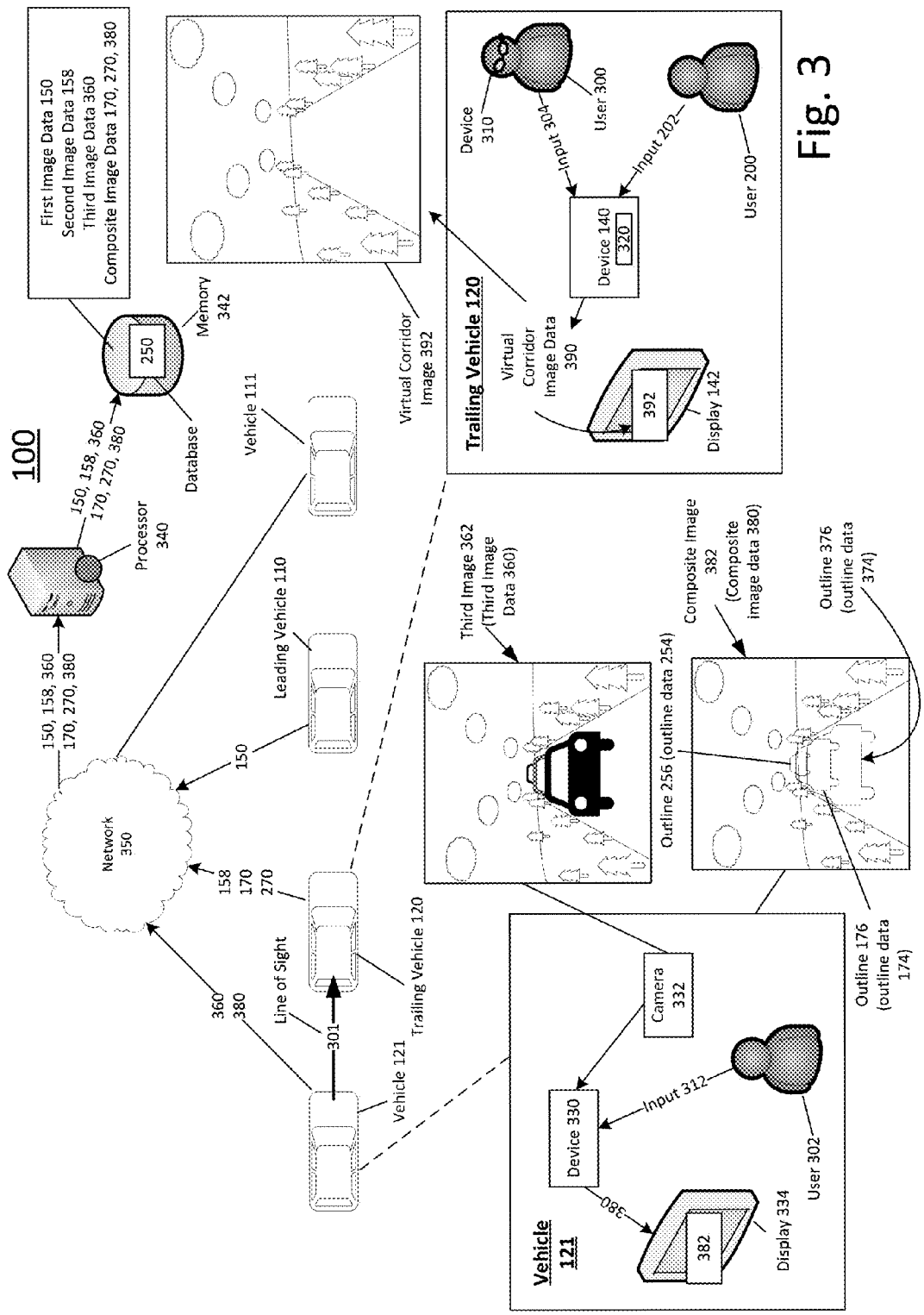
FIG. 3 illustrates the example system of FIG. 1 with additional detail relating to network storage and generation of a virtual corridor.

FIG. 3 illustrates system 100 of FIG. 1 with additional detail relating to network storage and generation of a virtual corridor, arranged in accordance with at least some embodiments described herein. FIG. 3 is substantially similar to system 100 of FIG. 1, with additional details. Those components in FIG. 3 that are labeled identically to components of FIG. 1 will not be described again for the purposes of clarity.

In an example, leading vehicle 110, vehicle 111, trailing vehicle 120, and/or vehicle 121 may be configured to be in communication with each other through a network 350. Network 350 may be a cellular network or a peer to peer ad-hoc network such as a vehicle to vehicle network. A processor 340 may be configured to be in communication with leading vehicle 110, vehicle 111, trailing vehicle 120, and/or vehicle 121 through network 350. Network 350 and/or processor 340 may be effective to provide additional functionality and/or data to system 100. For example, processor 340 may further configured to be in communication with a memory 342. Database 250 may be stored in memory 342 instead of a memory in a vehicle.

As is explained in more detail below, memory 342 may store one or more pieces of composite image data. Users in vehicle 120, 110 may then request particular composite image data stored in memory 342 through network 350. Memory 342 may also store image data captured by a vehicle, such as first image data 150 and second image data 158. In an example, vehicles in system 100 may exchange image data with each other by accessing memory 342 through network 350 instead of utilizing respective transmitters and receivers. For example, trailing vehicle 120 may retrieve first image data 150 from memory 342 in order to generate composite image data 170.

In the example, vehicle 121 may include a device 330, a camera 332, and/or a display 334. Device 330 may be configured to be in communication with camera 332 and/or a display 334. Device 330 may include the same components as device 130 (in leading vehicle 110) and/or device 140 (in trailing vehicle 120). Camera 332 may be configured to capture light reflected from objects ahead of vehicle 121 and may, in response, generate image data, such as third image data 360 that corresponds to objects ahead of vehicle 121. Third image data 360, when displayed on display 334, may produce third image 362, which may be an image of the objects ahead of vehicle 121. Camera 332 may send third image data 360 to device 330. Device 330 may send third image data 260 to processor 340 over a network 350.

A user 302 inside of vehicle 121 may view objects ahead of vehicle 121 through line of sight 301. In an example where line of sight 301 is directed at trailing vehicle 120, a field of view of user 302 may resemble third image 362, where trailing vehicle 120, leading vehicle 110, and vehicle 111 may be visible. User 302 may desire to remove trailing vehicle 120, leading vehicle 110, and vehicle 111 from the field of view. User 302 may provide an input 312, which corresponds to the production of composite image 382, to device 330. User 302 may provide input 312 to device 330 such as by voice command or by using one or more buttons inside of vehicle 121. Input 312 may be a request to generate composite image data 380. Composite image data 380, when displayed on a display of vehicle 121, may produce a composite image 382. Composite image data 380 may include outline data 174, outline data 254 that corresponds to an outline of object image 156, and outline data 374 that corresponds to an outline of an image of trailing vehicle 120. Outline data 374, when displayed on a display, may produce an outline 376 that may be an outline of trailing vehicle 120 to generate composite image data 380. Device 330 may retrieve composite image data 270 from memory 342 and may use composite image data 270 to generate composite image data 380. After generation of composite image data 380, device 330 may send composite image data 380 to processor 340 through network 350. Processor 340 may store composite image data 380 in memory 342.

Memory 342 may store composite image data 170, composite image data 270, and composite image data 380. Users in vehicles 111, 110, 120, 121 may request to view one or more particular composite images regardless of positions of the vehicles in system 100. For example, user 302 in vehicle 111 may request to view composite image 382 by sending a request to processor 340 for composite image data 380. Processor 340 may receive the request and, in response, may retrieve composite image data 380 and send composite image data 380 to vehicle 121.

In another example, system 100 may be effective to generate a virtual corridor that corresponds to objects surrounding leading vehicle 110, trailing vehicle 120, vehicle 111, and/or vehicle 121. A user 300 in trailing vehicle 120 may request that device 140 execute an application 320. User 300 may be a passenger of trailing vehicle 120. Application 320 may be an interactive application such as a video game or a visual presentation.

In the example, user 300 may provide an input 304, which corresponds to production of a virtual corridor image 392, to device 140. Input 304 may be a request for device 140 to execute application 320. In some examples, input 304 may include a request for one or more particular composite images stored in memory 342. Processor 240 of device 140 may receive input 304. Processor 240 may generate a request 312 in response to the analysis. Request 312 may include requests for one or more particular composite image data such as composite image data 380. Processor 240 may send request 312 to processor 340 through network 350. Processor 340 may receive request 312 and may retrieve composite image data 380 from memory 342. Processor 340 may then send composite image data 380 to device 140.

Device 140 may receive composite image data 380 and may identify outline data 174, 254, 374 in composite image data 380. Device 140 may remove outline data 174, 254, 374 from composite image data 380 to generate virtual corridor image data 390 that corresponds to virtual corridor image 392. Virtual corridor image data 390, when displayed on display 142, may produce a virtual corridor image 392 that shows objects surrounding leading vehicle 110, trailing vehicle 120, vehicle 111, and/or vehicle 121. Device 140 may display virtual corridor image 392 on display 142.

In the example, user 300 may control a device 310, which may be a wearable device such as virtual reality glasses. In some examples, device 310 may be a pair of three-dimensional glasses. User 300 may view virtual corridor image 392 using device 310 to interact with application 320. For example, when application 320 is a video game, user 300 may use device 310 to input commands relating to one or more application instances of application 320. In another example, where application 320 is a visual presentation such as a three-dimensional presentation, user 300 may use device 310 to view virtual corridor image 392 and may view objects, such as trees and clouds, in a three-dimensional format.

Among other possible benefits, a system in accordance with the disclosure may benefit users operating a vehicle and passengers of the vehicle. Users operating a vehicle may remove obscuring objects in a line of sight in order to see potential danger ahead of the vehicle and may make appropriate decisions. Passengers of the vehicle may implement the system to pass time during a ride in the vehicle and may assist the operator with decision making by viewing one or more composite images.

Figure 4:
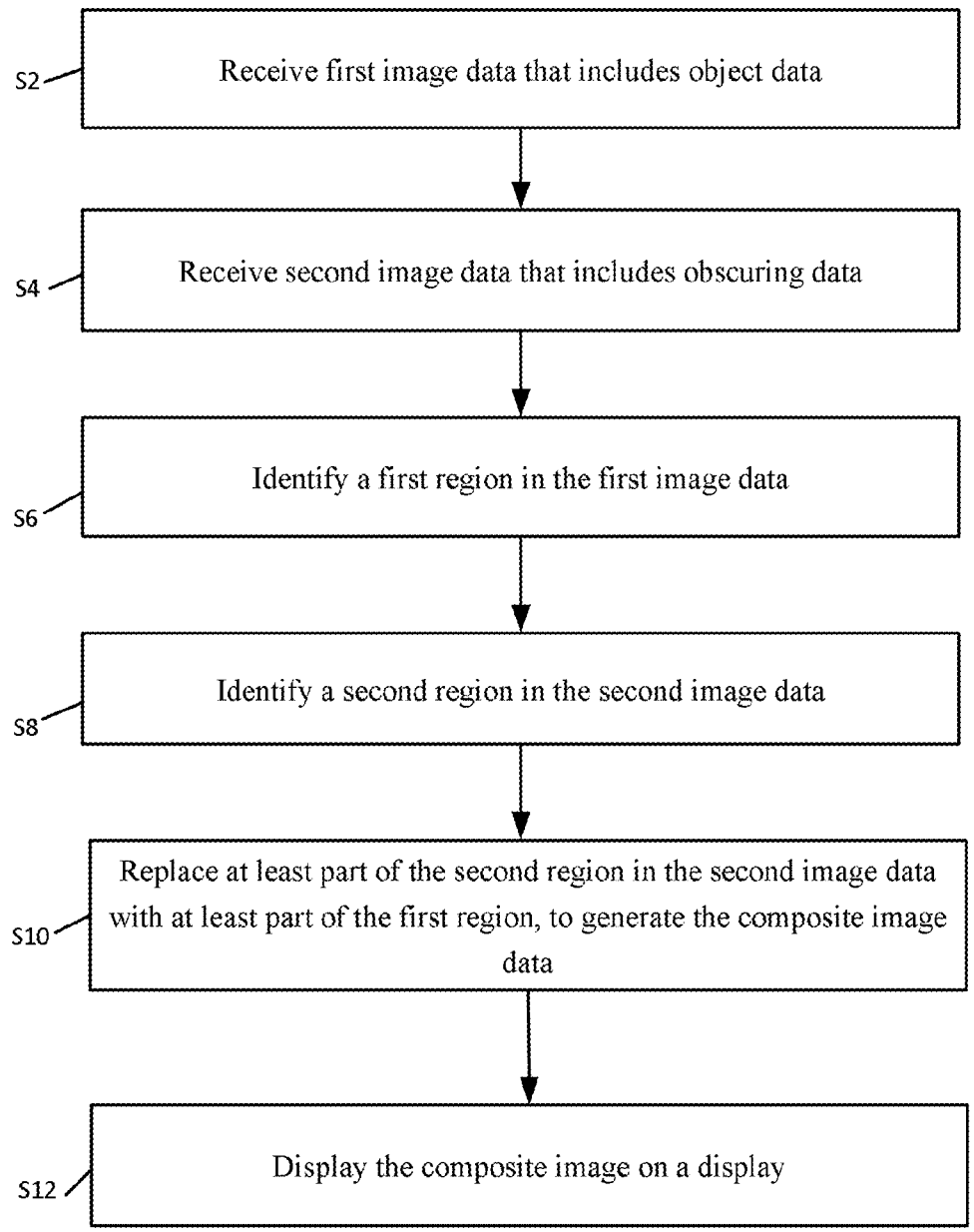
FIG. 4 illustrates a flow diagram for an example process for implementing composite image generation to remove obscuring objects.

FIG. 4 illustrates a flow diagram for an example process for implementing composite image generation to remove obscuring objects, arranged in accordance with at least some embodiments presented herein. The process in FIG. 4 could be implemented using, for example, system 100 discussed above. An example process may include one or more operations, actions, or functions as illustrated by one or more of blocks S2, S4, S6, S8, S10, and/or S12. Although illustrated as discrete blocks, various blocks may be divided into additional blocks, combined into fewer blocks, or eliminated, depending on the desired implementation.

Processing may begin at block S2, "Receive first image data that includes object data". At block S2, a device may receive first image data that includes object data. The object data may correspond to an object. The device may be inside of a vehicle.

Processing may continue from block S2 to block S4, "Receive second image data that includes obscuring data". At block S4, the device may receive second image data that includes obscuring data. The obscuring data, if displayed on a display, may obscure at least a portion of the object. In some examples, the vehicle may be a first vehicle. The obscuring data may correspond to a second vehicle and the first image data bay be received at the device from the second vehicle.

Processing may continue from block S4 to block S6, "Identify a first region in the first image data". At block S6, the device may identify a first region in the first image data. The first region may include the object data. The device may also identify a feature in the first region.

Processing may continue from block S6 to block S8, "Identify a second region in the second image data". At block S8, the device may identify a second region in the second image data. The second region may include the obscuring data. The device may also identify the feature in the second region. The device may determine a scaling factor based on the feature and may scale the first region based on the scaling factor in response. In some examples, the device may identify outline data that corresponds to an outline of the obscuring data.

Processing may continue from block S8 to block S10, "Replace at least part of the second region in the second image data with at least part of the first region, to generate the composite image data". At block S10, the device may replace at least a part of the second region in the second image data with at least part of the first region to generate the composite image data. The composite image data may include at least some of the object data. In some examples, the composite image data may further include the outline data.

Processing may continue from block S10 to block S12, "Display the composite image on a display". At block S12, the device may display the composite image on a display. The device may be inside of the vehicle.

FIG. 5 illustrates an example computer program product 500 that can be utilized to implement composite image generation to remove obscuring objects, arranged in accordance with at least some embodiments described herein. Computer program product 500 may include a signal bearing medium 502. Signal bearing medium 502 may include one or more instructions 504 that, when executed by, for example, a processor, may provide the functionality described above with respect to FIGS. 1-5. Thus, for example, referring to system 100, device 130 or device 140 may undertake one or more of the blocks shown in FIG. 4 in response to instructions 504 conveyed to the system 100 by signal bearing medium 502.

In some implementations, signal bearing medium 502 may encompass a computer-readable medium 506, such as, but not limited to, a hard disk drive, a Compact Disc (CD), a Digital Video Disk (DVD), a digital tape, memory, etc. In some implementations, signal bearing medium 502 may encompass a recordable medium 508, such as, but not limited to, memory, read/write (R/W) CDs, R/W DVDs, etc. In some implementations, signal bearing medium 502 may encompass a communications medium 510, such as, but not limited to, a digital and/or an analog communication medium (e.g., a fiber optic cable, a waveguide, a wired communications link, a wireless communication link, etc.). Thus, for example, computer program product 500 may be conveyed to one or more modules of the system 100 by an RF signal bearing medium 502, where the signal bearing medium 502 is conveyed by a wireless communications medium 510 (e.g., a wireless communications medium conforming with the IEEE 802.11 standard).

FIG. 6 is a block diagram illustrating an example computing device 600 that is arranged to implement composite image generation to remove obscuring objects, arranged in accordance with at least some embodiments described herein. In a very basic configuration 602, computing device 600 typically includes one or more processors 604 and a system memory 606. A memory bus 608 may be used for communicating between processor 604 and system memory 606.

Depending on the desired configuration, processor 604 may be of any type including but not limited to a microprocessor (μP), a microcontroller (μC), a digital signal processor (DSP), or any combination thereof. Processor 604 may include one more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with processor 604, or in some implementations memory controller 618 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622, and program data 624. Application 622 may include an obscuring object removal algorithm 626 that is arranged to perform the functions as described herein including those described with respect to system 100 of FIGS. 1-4. Program data 624 may include obscuring object removal data 628 that may be useful for implementation of composite image generation to remove obscuring objects as is described herein. In some embodiments, application 622 may be arranged to operate with program data 624 on operating system 620 such that implementations of composite image generation to remove obscuring objects may be provided. This described basic configuration 602 is illustrated in FIG. 6 by those components within the inner dashed line.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will also be understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to generate a composite image, the method comprising, by a first device that includes a first vehicle:
   receiving, from a second device, first image data that includes object data, wherein the object data corresponds to an object, wherein the second device includes a second vehicle;
   receiving second image data that include first obscuring data, wherein the first obscuring data corresponds to at least a part of the second device, the first obscuring data, if displayed on a display, would obscure at least a portion of the object;
   identifying a first region in the first image data, wherein the first region includes the object data;
   identifying a second region in the second image data, wherein the second region includes the first obscuring data;
   replacing at least part of the second region in the second image data with at least part of the first region, to generate first composite image data, where the first composite image data includes at least some of the object data;
   wherein the second device is configured to:
   receive the first composite image data;
   receive third image data that includes second obscuring data, wherein the second obscuring data, if displayed on the display, would obscure at least a portion of the object;
   identify a third region in the first composite image data, wherein the third region includes at least a portion of the object data;
   identify a fourth region in the third image data, wherein the fourth region includes the second obscuring data;
   replace at least part of the fourth region in the third image data with at least part of the third region to generate second composite image data, wherein the second composite image data includes at least some of the object data; and
   display the second composite image on the display.

2. The method of claim 1, wherein the display is inside the first vehicle.

3. The method of claim 1, further comprising, prior to replacing at least part of the second region with at least part of the first region:
   identifying a feature in the first image data;
   identifying the feature in the second image data;
   determining a scaling factor based on feature; and
   scaling pixels in the first region based on the scaling factor.

4. The method of claim 1, further comprising, prior to generating the first composite image data:
   identifying an outline of the first obscuring data; and
   generating outline data based on the outline,
   wherein the first composite image data includes the outline data.

5. The method of claim 4, wherein identifying the outline includes comparing the first obscuring data to a database that includes images of vehicles; and
the outline data includes an outline of a vehicle.

6. The method of claim 5, further comprising, prior to replacing at least part of the second region with at least part of the first region:
identifying a feature in the first image data;
identifying the feature in the second image data;
determining a scaling factor based on feature; and
scaling pixels in the first region based on the scaling factor.

7. A first device configured to generate a composite image, the first device comprising:
a first vehicle;
a camera;
a display;
a processor configured to be in communication with the camera and the display, the processor being configured to:
receive first image data from a second device, wherein the second device includes a second vehicle, the first image data includes object data, and the object data corresponds to an object;
receive second image data from the camera, wherein the second image data includes first obscuring data that corresponds to at least a part of the second device, and the first obscuring data, if displayed on the display, would obscure at least a portion of the object;
identify a first region in the first image data, wherein the first region includes the object data;
identify a second region in the second image data, wherein the second region includes the first obscuring data;
replace at least part of the second region in the second image data with at least part of the first region to generate first composite image data, where the first composite image data includes at least some of the object data;
receive third image data that includes second obscuring data, wherein the second obscuring data, if displayed on the display, would obscure at least a portion of the object;
identify a third region in the first composite image data, wherein the third region includes at least a portion of the object data;
identify a fourth region in the third image data, wherein the fourth region includes the second obscuring data;
replace at least part of the fourth region in the third image data with at least part of the third region to generate second composite image data, wherein the second composite image data includes at least some of the object data; and
display the second composite image on the display.

8. The first device of claim 7, wherein the display is a three-dimensional display.

9. The first device of claim 7, wherein the camera and the display are inside of the first vehicle.

10. The first device of claim 7, wherein the processor is further configured to:
prior to replacement of at least part of the second region with at least part of the first region:
identify a feature in the first image data;
identify the feature in the second image data;
determine a scaling factor based on the feature; and
scale pixels in the first region based on the scaling factor.

11. The first device of claim 7, wherein:
the second device is further configured to identify an outline of the first obscuring data and generate outline data based on the outline; and
the first composite image data includes the outline data.

12. The first device of claim 7, wherein identification of the outline includes comparison of the first obscuring data to a database that includes images of vehicles; and
the outline data includes an outline of a vehicle.

13. A system configured to generate a composite image, the system comprising:
a first device, wherein the first device includes:
a first vehicle;
a first camera;
a transmitter;
a first processor configured to be in communication with the first camera and transmitter; and
a second device, wherein the second device includes;
a second vehicle;
a display;
a second camera;
a receiver; and
a second processor configured to be in communication with the second camera, the receiver and the display; and
the first camera configured to generate first image data, wherein the first image data includes object data, and the object data corresponds to an object;
the first processor configured to transmit the first image data through the transmitter from the first device to the second device;
the receiver configured to receive the first image data;
the second camera configured to generate second image data, wherein the second image data includes first obscuring data that corresponds to at least a part of the first device, and the first obscuring data, if displayed on the display, would obscure at least a portion of the object;
the second processor configured to:
receive the first image data;
receive the second image data;
identify a first region in the first image data, wherein the first region includes the object data;
identify a second region in the second image data, wherein the second region includes the first obscuring data;
replace at least part of the second region in the second image data with at least part of the first region to generate first composite image data, where the first composite image data includes at least part of the object data;
receive third image data that includes second obscuring data, wherein the second obscuring data, if displayed on the display, would obscure at least a portion of the object;
identify a third region in the first composite image data, wherein the third region includes at least a portion of the object data;
identify a fourth region in the third image data, wherein the fourth region includes the second obscuring data;
replace at least part of the fourth region in the third image data with at least part of the third region to generate second composite image data, wherein the second composite image data includes at least some of the object data; and
display the second composite image on the display.

14. The system of claim 13, wherein:
the obscuring data corresponds to the first vehicle.

15. The system of claim 13, wherein the processor is further configured to, prior to replacement of at least part of the second region with at least part of the first region:
- identify a feature in the first image data;
- identify the feature in the second image data;
- determine a scaling factor based on feature; and
- scale pixels in the first region based on the scaling factor.

16. The system of claim 13, wherein:
the processor is further configured to identify an outline of the first obscuring data and generate outline data based on the outline; and
the first composite image data includes the outline data.

17. The system of claim 16, wherein identification of the outline includes comparison of the first obscuring data to a database that includes images of vehicles; and
the outline data includes an outline of a vehicle.

\* \* \* \* \*